United States Patent [19]
Gibbs et al.

[11] Patent Number: 5,431,570
[45] Date of Patent: Jul. 11, 1995

[54] MECHANICAL AND/OR ELECTRO-MECHANICAL INTERCONNECT SYSTEM FOR VEHICLE LOAD CARRYING COMPONENTS/ACCESSORIES

[75] Inventors: Andrew H. Gibbs; Douglas P. Gibbs, both of Yuba City, Calif.

[73] Assignee: Sport Rack Systems, Inc., Yuba City, Calif.

[21] Appl. No.: 165,733

[22] Filed: Dec. 10, 1993

Related U.S. Application Data

[63] Continuation of Ser. No. 863,200, Apr. 3, 1992, Pat. No. 5,306,156.

[51] Int. Cl.⁶ ............................................ H01R 11/00
[52] U.S. Cl. ........................................ 439/39; 29/854; 224/315
[58] Field of Search ............... 439/34; 40/592; 224/315, 331; 29/859

[56] References Cited

U.S. PATENT DOCUMENTS

| | | | |
|---|---|---|---|
| 2,688,688 | 9/1954 | Holtz | 240/7.1 |
| 3,863,999 | 2/1975 | Muller et al. | 439/34 |
| 4,934,752 | 6/1990 | Bryant | 40/592 X |

FOREIGN PATENT DOCUMENTS 4-71942  3/1992  Japan ....................... 40/592

*Primary Examiner*—Eugene F. Desmond
*Attorney, Agent, or Firm*—Flehr, Hohbach, Test, Albritton & Herbert

[57] ABSTRACT

A latch for removably securing one of a plurality of different accessories to an automobile is described. The latch includes a mounting structure which is permanently installed on the vehicle in a manner which assures that the static and dynamic loading expected by reason of the differing accessories are supported by the vehicle. The latch also provides electrical feed-through for accessories that might need the same, and remote and/or locking securance.

23 Claims, 11 Drawing Sheets

MECHANICAL AND/OR ELECTRO-MECHANICAL INTERCONNECT SYSTEM FOR VEHICLE LOAD CARRYING COMPONENTS/ACCESSORIES

This is a continuation of application Ser. No. 07/863,200 filed Apr. 3, 1992, now U.S. Pat. No. 5,306,156.

BACKGROUND OF THE INVENTION

This invention relates generally to mounting accessories on the exterior of road and off-road terrain vehicles, such as automobiles, and specifically to an accessory latching arrangement and method of latching that utilizes an accessory mounting structure which is permanently secured to a road or off-road terrain vehicle. (The term "road" vehicle as used hereinafter is meant to include off-road terrain vehicles, but not aircraft or water vessels.)

It is common to mount exterior accessories to an automobile or other road vehicle. There are several problems that are associated with such mounting. For one there often is a requirement that there be an electrical pass-through from the vehicle to the accessory. Accessories such as exteriorly mounted driving lights, emergency lighting systems, antennas and vehicle telecommunication or transponder systems typically do require such pass-through.

Another problem is that the static and dynamic loading expected by reason of a road vehicle accessory will be transmitted to the vehicle for support. This extra loading will be due to the weight and expected interaction of the accessory itself with air at the speed of operation, and the same factors with respect to the load. The accessory must be so mounted to the road vehicle that the necessary vehicular support will be provided for both it and its expected load.

By reason of these and other problems those in the art typically have focused on providing the necessary securance and feed-through with the particular requirements of a specific accessory in mind. For example, roof racks for skis, bicycles, luggage cases or other loads to be secured on a road vehicle are often designed to be secured to aspects of the vehicle, such as rain gutters, openable doors, trunk lids, etc., which will provide the necessary structural support and rigidity. While some roof racks are only secured to a vehicle exterior body panel or "skin", racks of this nature often are limited in capacity or are only decorative.

The permanent securance of an accessory to the exterior of a road vehicle often has undesirable consequences. For example, many emergency vehicles, e.g., law enforcement vehicles, are sold for general use after it is believed their useful life as emergency vehicles is finished. In general, however, an emergency vehicle of this type requires one or more externally mounted accessories, such as warning lights, etc. Various steps have been taken to permit these accessories to be removed from the emergency vehicle without visible damage, to enable the same to be converted to general usage. For example, reference is made to U.S. Pat. No. 4,934,752 which describes an emergency vehicle accessory mounting arrangement relying on piercing a vehicular roof in a manner that a sun roof can be used to replace the warning equipment accessory when the vehicle is converted to general use. One other consequence is that when a permanently mounted emergency vehicle warning accessory is provided, the entire vehicle must be taken out of service when the warning accessory needs to be repaired. U.S. Pat. No. 3,863,999 discusses this problem and teaches as a solution, the provision of a warning device which is removable from the vehicle for repair and/or replacement.

SUMMARY OF THE INVENTION

The present invention provides a latching arrangement which overcomes the difficulties mentioned above. As one salient aspect of the apparatus, the latch includes a mounting structure which is permanently installed on a road vehicle but is designed to interface with accessories of different types. Thus, differing accessories can use the very same mounting structure at differing times. The mounting structure is designed to accommodate the expected static and dynamic loading of all of those accessories potentially usable therewith. As another aspect of the invention, the mounting structure includes cooperable components for permanent mounting on the road vehicle, which components provide securance to the road vehicle in such a way as to transmit to such road vehicle, the static and dynamic load expected by reason of an accessory. Such components provide an exposed mechanical and/or electrical connector at the exterior of the vehicle to mate with corresponding connectors on any one of a plurality of different accessories. These components are designed to facilitate permanent securance of the mounting structure to a road vehicle skin, thereby assuring that expected loading can be accommodated even though the permanent mount is not connected directly to internal framework or structure of the vehicle. This allows much more freedom as to placement of the permanent latching mounting structure.

As another salient aspect of the invention, the permanent mounting structure provides an electrical connector exposed to the exterior for mating with a corresponding electrical structure associated with an accessory. Most desirably the electrical connector is so located that it will automatically mate with a corresponding connector on an accessory when the mechanical connection is made. Moreover, the accessory will seal the same from the ambient environment. As another feature of the invention in some instances remote manipulation, such as from within a passenger compartment, is provided for the connection/disconnection of an accessory. Moreover, it is designed to enable incorporation of a variety of mechanical principles for the connectors, e.g., rotational cam-tightening, captive screws, and over-center levers.

One major advantage of the invention is that it facilitates satisfaction of requirements imposed on mass production automobiles sold in a country. The purpose of many of such requirements is to initiate production of more fuel efficient vehicles by assuring that the estimated highway mileage average of all vehicles produced by a manufacturer is within an allowable maximum. A manufacturer can make smaller and lighter vehicles in an effort to satisfy these requirements. This usually is at the expense of trunk and passenger compartment space in the vehicle. Buyers and users of such down-sized vehicles miss the larger carrying space for general luggage or sporting equipment transportation, and have turned to externally mounted racks to supply the desired load-carrying capacity. Thus, in an effort to satisfy this customer requirement for more load-carrying capacity on down-sized vehicles, manufacturers are installing or making available load carrying rack systems as optional accessories. Vehicles with permanently mounted racks must be tested and analyzed with the rack installed. These racks can result in mileage decrease as a result of increased frontal drag and turbulent wind flow at highway speeds, contrary to the intent of downsizing. They can also result in increased noise. It is well known to those in the field, though, that a road vehicle delivered to the market having a consumer attachable-detachable rack normally will not be required by regulations to be tested with the rack installed if the rack is delivered with the vehicle to customers as a detached accessory. The present invention accommodates this by providing a permanently installed mounting structure on a vehicle for an accessory which can be added by the customer/user if desired after delivery of the vehicle to them.

Another advantage of the present invention is that it transfers static and dynamic loading by reason of an attached accessory directly through the latch system to a roof or body panel or indirectly to structural elements in or supporting the roof or other body panel of the host vehicle.

Yet another advantage of the present invention is that antennae for cellular phones, radios, transceivers for intelligent vehicle highway systems (IVHS), collision avoidance systems, emergency vehicle lighting systems, taxi and commercial illumination placards, and marker lights or driving lamps which are attachable to the accessory or integral within the attachable accessory will be electrically interconnected automatically to the vehicle upon attachment of the accessory mechanically to the vehicle.

Yet another advantage of the present invention is the ability to interchange a variety of accessories, with or without electrical requirements, without the use of tools to one or more of the permanently mounted latch structures on the road vehicle.

Yet another advantage of the present invention is the ability to detach an accessory for the purpose of upgrading to a future accessory which may not be currently available or a replacement accessory containing more of the desired features, and the ability to detach any mounted accessory for the purpose of service or repair to that accessory.

Yet another advantage of the present invention is that passive locking is provided when the connector(s) of permanently installed latch structure(s) are actuated by means located within the vehicle interior or on the inside of closed, lockable doors and panels. In this connection, while removable automobile hard-top roofs and convertible tops have provided for quick, secure attachment of the roof to the vehicle with latching arrangements having a plurality of permanently installed inter-fitting male and female components for said attachment, these systems have not been designed to accommodate different accessories.

Other features and advantages of the invention either will become apparent or will be described in connection with the following, more detailed description of preferred embodiments of the invention.

BRIEF DESCRIPTION OF THE DRAWING

With reference to the accompanying drawing.

DESCRIPTION OF THE PREFERRED EMBODIMENTS

The following relatively detailed description is provided to satisfy the patent statutes. However, it will be appreciated by those skilled in the art that various changes and modifications can be made without departing from the invention as defined by the claims and their equivalents.

Figure 1:
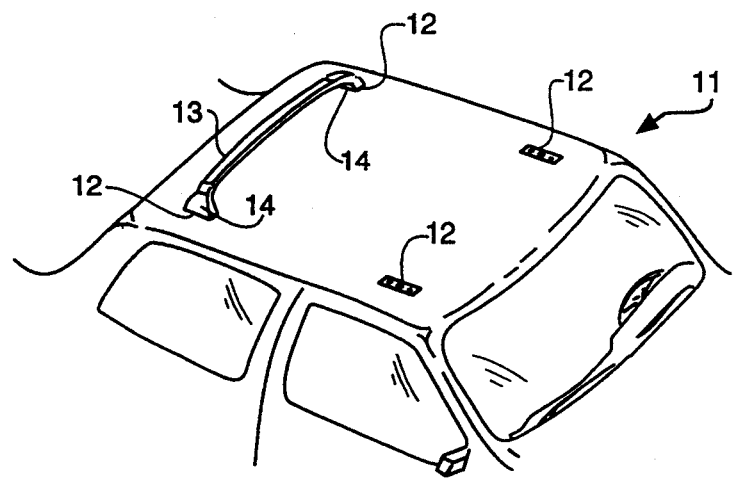
FIG. 1 is a perspective view showing a plurality of mounting structures for an easily manipulatable latch of the invention securing an accessory to the roof panel of a vehicle.

FIG. 1 illustrates an automobile, generally referred to by the reference numeral 11, having a plurality of mounting assemblies or structures 12 of the latch of the invention permanently installed on its roof panel for mounting an accessory unit thereon. A load supporting accessory 13 having a cross bar extends between two pedestals 14. As illustrated, the pedestal in this arrangement is part of the rack. It is not necessary in every embodiment, though, that such pedestal be part of the rack. Each of the pedestals 14 incorporates another part of the latch of the invention as will be described. A like rack assembly having a cross bar with pedestals at its ends may be installed on the front set of mounting structures 12 in a like manner.

Figure 2:
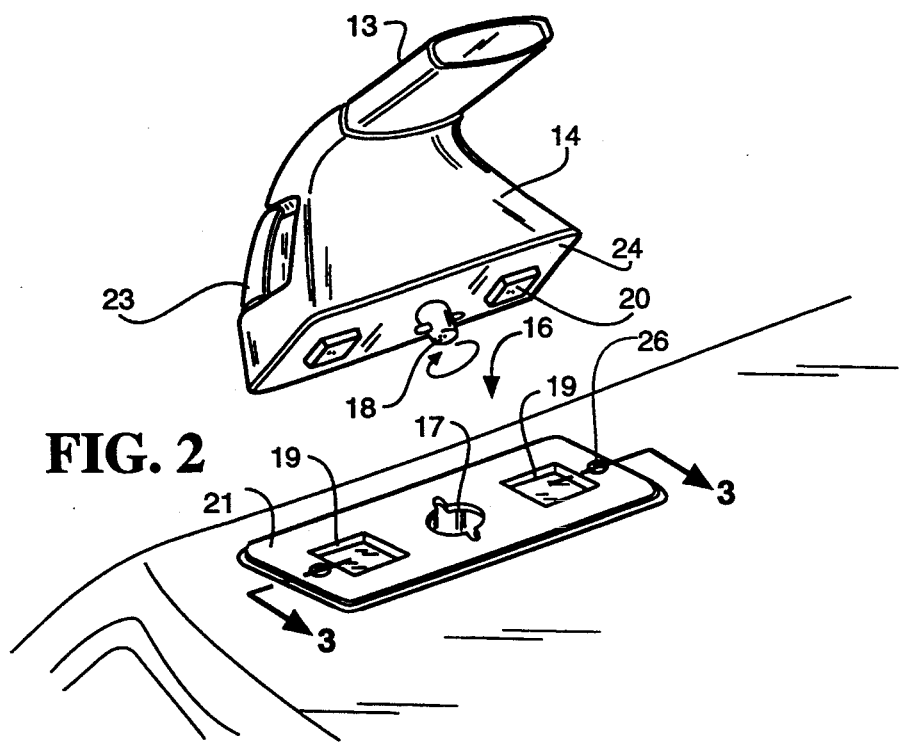
FIG. 2 is a perspective partial view illustrating a preferred embodiment of the invention.
Figure 3:
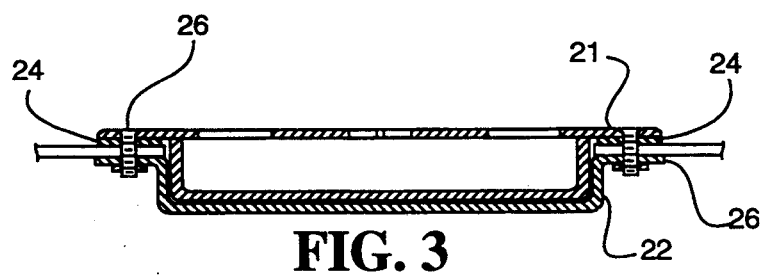
FIG. 3 is a sectional view of the mounting structure of the latch, taken on the plane indicated in FIG. 2 by the lines 3—3.

FIG. 2 illustrates the latch of the invention in more detail. It is divided between two parts, an accessory mounting assembly or latching structure and a mounting structure which is permanently installed on the vehicle so as to be substantially flush with the exterior surface of the vehicle. In this connection, the roof panel itself is provided with an aperture for accepting the members to be described provided by the mounting structure 16 of the latch. Mounting structure 16 is permanently installed and includes both a connection component 21 and a backing component 22 secured to the vehicle on the side of the body panel opposite that of the connection component. These components sandwich the vehicle body panel between the same and transmit to the vehicle, both the static and dynamic load expected by reason of an accessory. This sandwiching also seals the components to the body panel. The sandwiching is best seen in FIG. 3. A sealing gasket 24 is located between the two components as illustrated, and a plurality of fasteners 26, such as bolts, extend through registering apertures between the two components and the roof panel edges to provide such sandwiching. As brought out earlier, one of the important aspects of the instant invention is that it can accommodate different accessories. To facilitate this, it is important that the connection and backing components be designed to transmit the static and dynamic loading expected by all of the differing accessories.

Mounting structure 16 includes a mechanical connector 17 at the exterior of the vehicle positioned to mate with and connect to a corresponding mechanical connector 18 in the form of a locking stud, associated with the accessory latching structure. A pair of locating keeper recesses or apertures 19 are also provided by the road vehicle mounting structure for cooperable engagement with corresponding bosses or keepers 20 of the accessory latching structure. The coupling of the protuberances or keepers 20 with the apertures 19 provide for resistance to lateral loading in a plane generally parallel to the plane of the top surface of the mounting structure 16. Most desirably, the keepers and the apertures are sized for tight interfitting engagement to aid in rigid non-moving interaction between the vehicular mounting structure and accessory latching structures.

Much of the latching structure associated with the accessory can be integrally molded or otherwise be an integral part of the pedestal 14, or can be components of a separate assembly mounted in and affixed to such pedestal. The pedestal acts, in effect, as a mating part of the accessory that is removable from the remainder thereof. The accessory latching structure includes not only the connector 18 but an actuator 23 for operating such connector. This actuator is manually manipulatable without the use of tools. It can be rotated by 90° by hand, and it is connected by conventional means (not shown) to cause corresponding 45° rotation of connector 18. (It is to be noted that such connector is illustrated rotated by 45 degrees relative to the mating connector 17 of the vehicle mounting structure. This shows its position after passing through the connection component and assuring rigid connection therebetween.)

The fact that the actuator 23 is manipulatable without the use of tools is an important aspect of the invention. It enables a user to simply attach or detach an accessory, or change accessories, in a simple manner. Rotation of actuator 23 results in the accessory latching structure and the vehicle mounting structure being drawn together. Moreover, the sealing gasket 24 is most desirably a sheet of resilient and compliant material which facilitates tight and rigid mating between the two main structural parts of the latch. In this connection, the locking component 17 can include ramps or the like located on the other side of its recess to facilitate drawing the pedestal 14 against the top surface of the vehicle mounting structure to compress the resilient gasket 24 and aid in forming a load supporting and load resisting coupling between the pedestal 14 and the road vehicle mounting structure.

Figure 4:
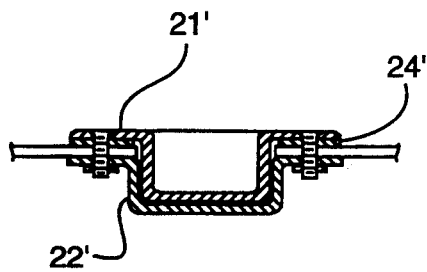
FIGS. 4 through 8 are sectional views indicating alternative constructions for the mounting structure.

The manner in which the connection and backing components of the vehicle mounting structure are provided can vary significantly. FIGS. 4 through 8 are views of some variations of mounting structures installed substantially flush with the exterior surface of the vehicle although these variations are not to be considered to be exhaustive of all possibilities. The variation illustrated by the sectional view in FIG. 4 is quite similar to the structure of the previously described embodiment. As can be seen by comparing FIGS. 3 and 4, though, in the FIG. 4 embodiment the depressed portion of the connection component 21' is an integral part of the exposed portion of the same. This figure also emphasizes the fact that the hole made in the road vehicle panel is elongated and the sandwiched panel side edges are relatively close together. In this connection, FIG. 4 is a sectional view of the variation represented by the same, taken on a plane which is 90° from the plane represented by FIG. 3.

Figure 5:
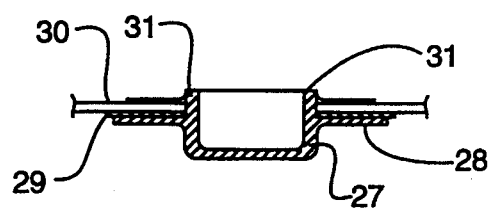

FIG. 5 shows another variation in which mounting structure 27 incorporating both the backing and connection components is inserted through a previously pierced hole from the underside of the vehicle panel, allowing a flanged portion thereof 28 to rest upon and retain a gasket 29 or other sealing means. A spring clip 30 on the top of the exterior panel, having a largely unbroken perimeter, is slipped on to the outwardly protruding edge of the structure 27 such that a plurality of deformable interference inducing projections extending radially inward from the same. A raised rib 31 about the top perimeter of the structure 27 allows the spring clip to slip over its edge and down upon the vertical perimeter wall so that the clip will be prevented from being removed. Attachment of an accessory (not shown) will tend to seat the clip further onto the structure 27 by compressing the sealing or gasket means. A permanent cost effective installation is thus realized.

Figure 6:
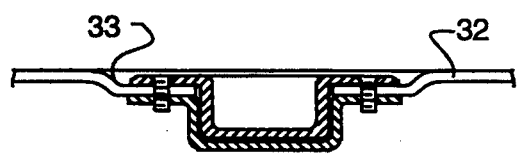

FIG. 6 further shows a permanently mounted structure similar to that of FIG. 4 but with the road vehicle panel 32 having a dimpled recess 33 to accommodate the mounting structure, thereby providing substantially increased rigidity and resistance to loading while allowing a flush, aerodynamically "clean" appearance. The fastening means may be the same as that used with the earlier described variations or by other appropriate means.

Figure 7:
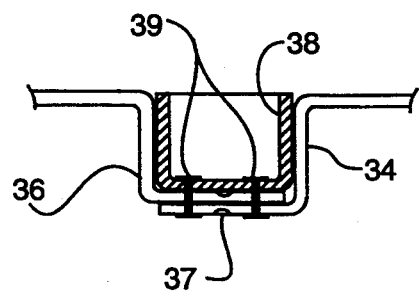

FIG. 7 shows a mounting structure in which the backing component is made up by the road vehicle panel itself. That is, a seam is provided adjoining two body panel parts 34 and 36 by electrical resistance welding as represented at 37. The seamed panel parts 36 and 37 are more structurally sound than a flat panel and together form a backing component into which a connection component 38 is inserted. These mounting structures could be any of the variations described previously. A plurality of fastening means 39 are shown securing the connection component within the backing component provided by the seamed panel recess.

Figure 8:
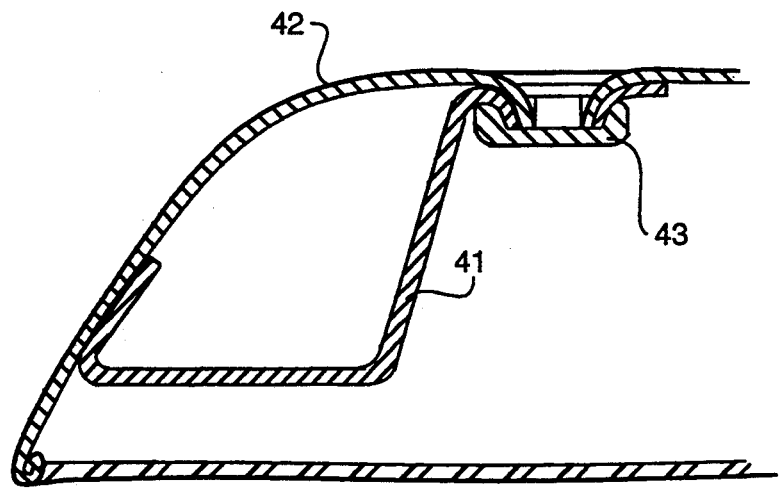

In some instances it is not necessary that the mounting structure include a separate backing component. For example, this is the case when the structural framework of the vehicle provides the backing component and to which the connector component of the mounting structure can be secured directly. FIG. 8 shows such an arrangement. Such view is a broken-away side sectional view of the construction of an automobile at its curved side. The structural framework of the automobile includes an elongated channel section 41 which is secured via an appropriate means to the roof panel portion 42 via an appropriate means, such as resistance welding. As illustrated, a connector component represented at 43 circumscribes a pierced aperture through both the body panel and the structural framework channel. The pair of metal sheet portions which are circumscribed by the mounting structure cooperate with the connection component to support at their location static and dynamic loading of an accessory.

Figure 9:
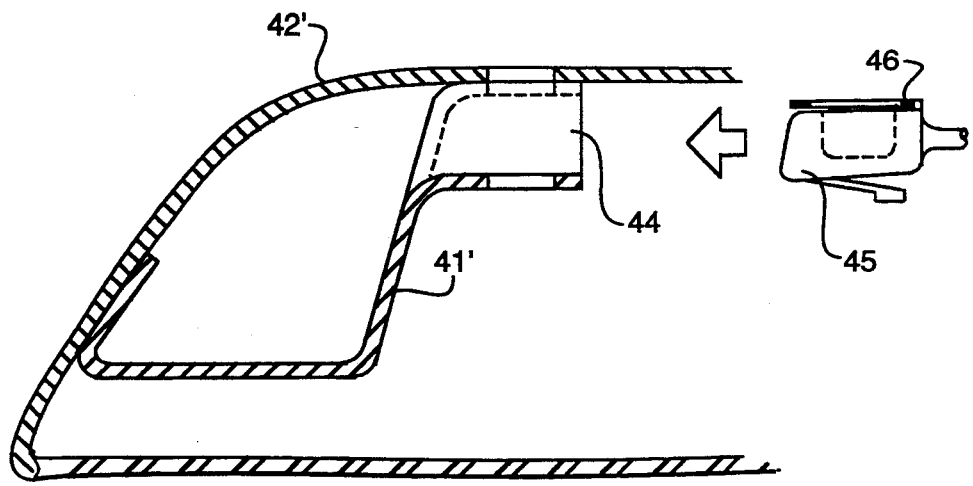
FIGS. 9 and 10 illustrate an arrangement which facilitates post-assembly of a mounting structure on a vehicle.
Figure 10:
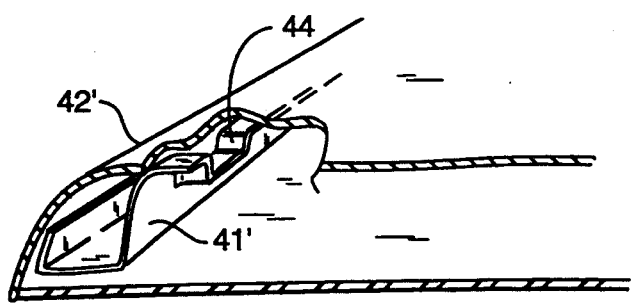

FIGS. 9 and 10 illustrate an arrangement for a substantially flush mounting structure in which not only the backing component is provided by structural framework of the vehicle, but facilitates post-assembly, e.g., by a dealer rather than the manufacturer. The channel 41' is provided by the manufacturer with the requisite bends to define cavities, one of which is indicated at 44, with the roof panel. The connector component 45 then can be installed at a later time, e.g., after holes are accurately punched or drilled with a template (an art common in the trade) allowing access to the preformed cavities. The component 45 can be fabricated from plastic, metal or a combination thereof, and can be modular to accommodate electrical and mechanical interfaces. It can include a simple snap-in type of connection as is illustrated, and most desirably a sealant or gasket 46 is included to provide a barrier to the elements. It should be noted that while this construction facilitates post-assembly, it also can be used by the manufacturer for a pre-assembly arrangement.

Figure 11:
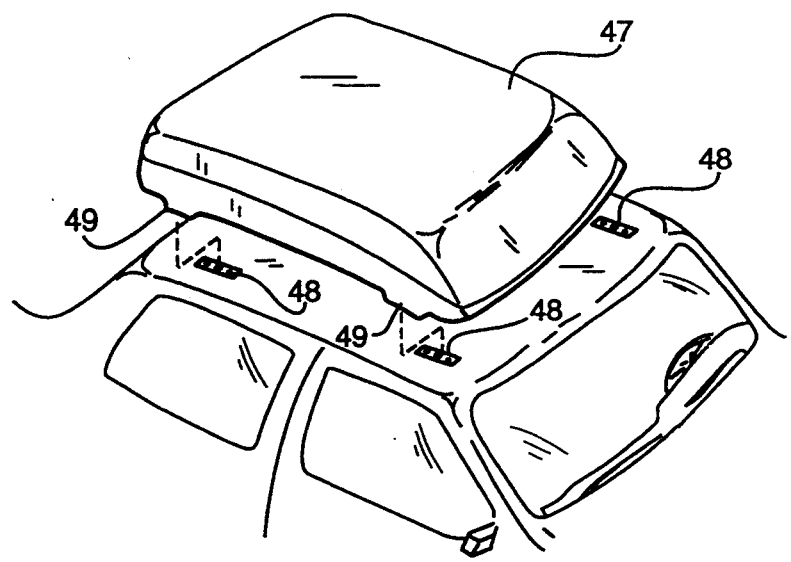
FIGS. 11 and 12 illustrate some of the other accessories for which the invention is applicable.

FIG. 11 shows an enclosed accessory case 47 capable of carrying substantial loads within its internal cavity. Latch mounting structures 48 are permanently affixed to the road vehicle roof panel. Connection components 49 protrude downwardly from the underside of the case and are aligned to the dimensionally spaced mounting structures 48 to connectably interfit with and form a removable connection with the same. The case exterior is designed so as to minimize the void between the underside of the case and the exterior surface of the vehicle, and to contribute a minimum to the aerodynamic drag of the entire vehicle.

Figure 12:
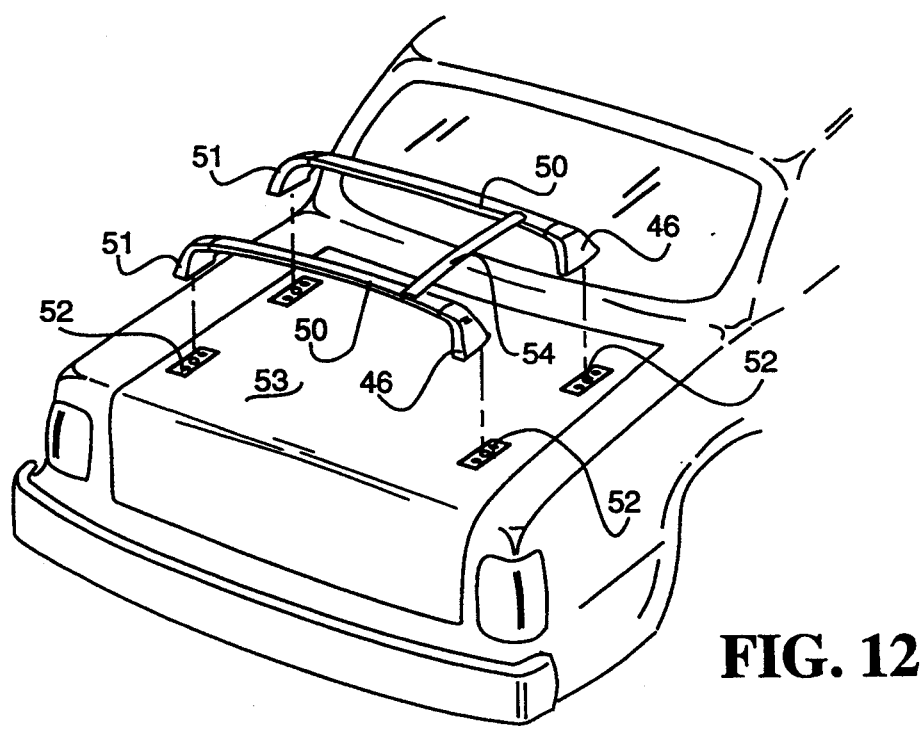

FIG. 12 shows a rack assembly having two crossbars 50, each of which is connectably attached to two pedestals 51 of the type illustrated earlier which detachably mount to a plurality of appropriately positioned latch mounting structures 52 on an automobile trunk panel 53. An optional load supporting tie bar 54 is shown which is permanently attached or is detachable from the crossbars 50, a multitude of which can be affixed between the parallel crossbars such that increased load distribution is realized. It should be noted that the accessory being described not only is a different one than that illustrated in FIG. 11, it is of a different type, i.e., made up of cross bars and the like rather than being an enclosed case as in FIG. 11.

Figure 13:
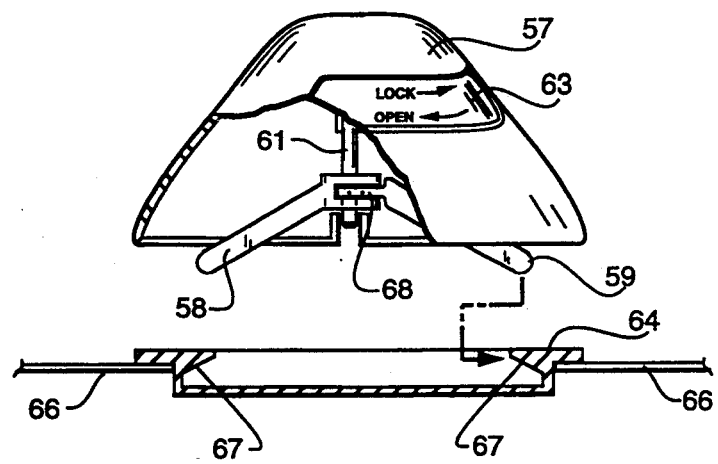
FIGS. 13 through 17 illustrate some of the connector arrangements that can be incorporated into the instant invention.
Figure 14:
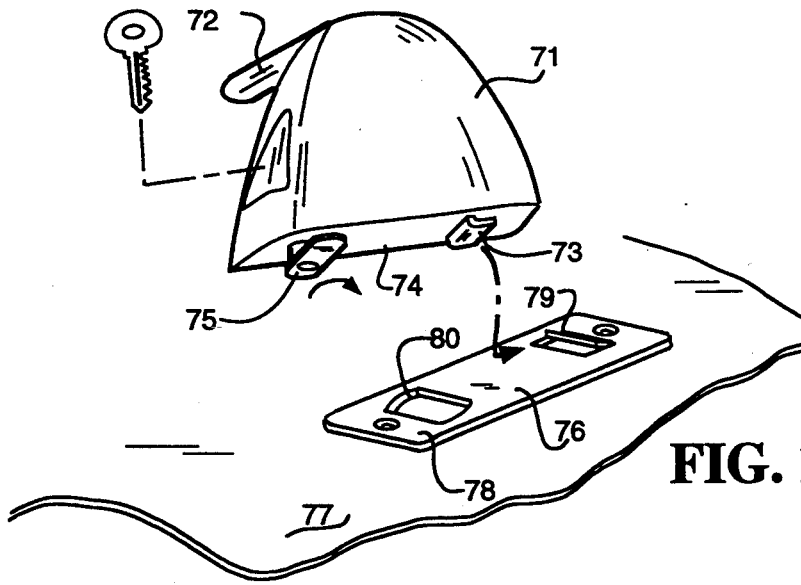
Figure 15:
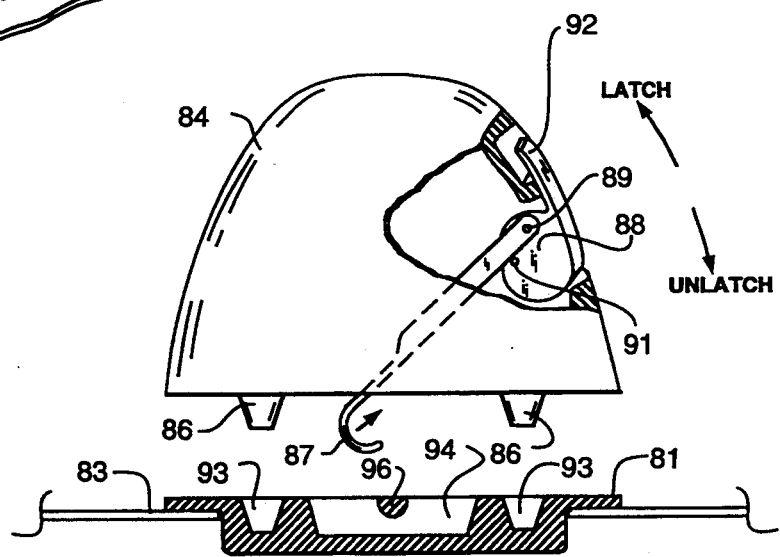

FIGS. 13 through 15 illustrate variations of the connector arrangement for use with substantially flush mounting structures. In FIG. 13 a partially broken and sectional view 2 is provided of an accessory pedestal 57 having a plurality of slidably retracting locking bars 58 and 59 which are connectably attached to an actuating shaft 61 which, in turn, is actually connected to an actuation lever 63. An accessory mounting structure 64 is shown in sectional view with a smaller length extending downward and past the interior surface of a road vehicle body panel 66, with a flange resting on the exterior surface of such panel. A plurality of opposed, outwardly and downwardly angled ramps 67 are located within the cavity of the mounting structure. (The latter can be attached to the vehicle by any suitable means, such as that used in the FIGS. 3–8 variations.) Now, rotation of the locking lever 63 counterclockwise by 90 degrees results in eccentric 68 drawing the locking bars 58 and 59 upward and inward so that the dimension between the ends result in both passing by the minor dimension of the top of the ramps 67 of the structure 64 to connect the pedestal 57 to the structure 64. Upon rotation of the locking lever 63, and the simultaneous extension of the locking bars 58 and 59 by eccentric rotation of the shaft 61, the bars engage the ramps 67 thereby drawing the pedestal tightly against, but removably attached, to the vehicle latch mounting structure. A resilient pedestal pad similar to pad 24 is desirably installed between the pedestal and mounting structure to provide compressible resistance to the cam and locking bar extension, and a consequent closely coupled interfit between the pedestal and the mounting structure.

Yet another pedestal to mounting structure arrangement is shown in FIG. 14. A pedestal 71 having a laterally projecting and load supporting bar 72, such as a rack crossbar which would be connectably attached to a second pedestal, has both a locking projection 73 extending below its base 74 and a locking means with a rotatable cam 75, shown in an unlatched position, at the end opposite the locking projection 73. A mounting structure 76 is attached to a road vehicle body panel 77 with a flange 78 resting on the panel exterior. An appropriate sealer or gasket can be positioned between the underside of the flange 78 and the top surface of the panel 77 as in FIG. 2. Mounting the pedestal to the vehicle mounting structure is realized by first sliding the leading edge of the locking projection 73 into the mating aperture 79 of the vehicular mounting structure, and then inserting and rotating the cam 75 in a corresponding mating aperture 80 for the same. Adequate resistance to lateral and vertical loading is realized through the plurality of through-penetration and interlocking of the mating details of the mounting structure and pedestal portions of the latch.

Now looking at FIG. 15, a road vehicle mounting structure 81 is attached and affixed to the road vehicle body. That is, it is inserted from the exterior of the panel 83 and extends toward the interior of the vehicle. An accessory pedestal capable of sequentially supporting various static and dynamic loads has an exterior shell 84 and a base with extending bosses 86. It also has an over-center cam type latch mechanism that includes a latch hook 87 pivotally attached to a cam lever 88 by means of a hinge pin 89. Lever 88 is pivotally attached to pedestal shell 84 by means of a hinge pin 91, and it has an actuation handle 92 integral therewith. To removably affix the pedestal to the mounting structure, the lever is rotated to the unlatched position (clockwise relative to the drawing) to thereby extend the hook 87 downward to the right, and the pedestal is lowered onto the mounting structure with the lateral load resisting bosses 86 engaging and interfitting mating recesses 93 provided by the mounting structure, which recesses are designed to tightly couple with the bosses 86. The hook 87 enters a mating cavity 94 in the mounting structure and rests under and to the left of cross member 96. Upon lifting of the lever handle 92 in a counterclockwise direction, the latch hook 87 is drawn toward the lever 91 in a manner which causes the hook to engage the laterally extending crossmember 96 and draw together tightly the pedestal base and bosses 86 and the top surface of the mounting structure 83 and boss recesses 93. A resilient pedestal pad similar to pad 24 of the FIG. 2-3 embodiment can be fitted between the pedestal and mounting structure to provide a compressive fit. The bosses additionally prevent the pedestal from sliding relative to the mounting structure in a direction opposed to the lateral forces induced on the latch hook upon actuation of the latch lever. Upon closing the latch handle 92 to its resting place against the pedestal, the latch hook hinge pin 89 is located above the lever hinge pin 91, thereby remaining over the centerline of the lever hinge pin 91 and causing a force on the lever handle 92 toward and along a line directly to the latch hook 96 biasing the lever in the closed position resistant to opening. A lock (not shown) can be installed if desired into the lever handle 92 to lock the same closed against the pedestal and prevent unauthorized opening.

Figure 16:
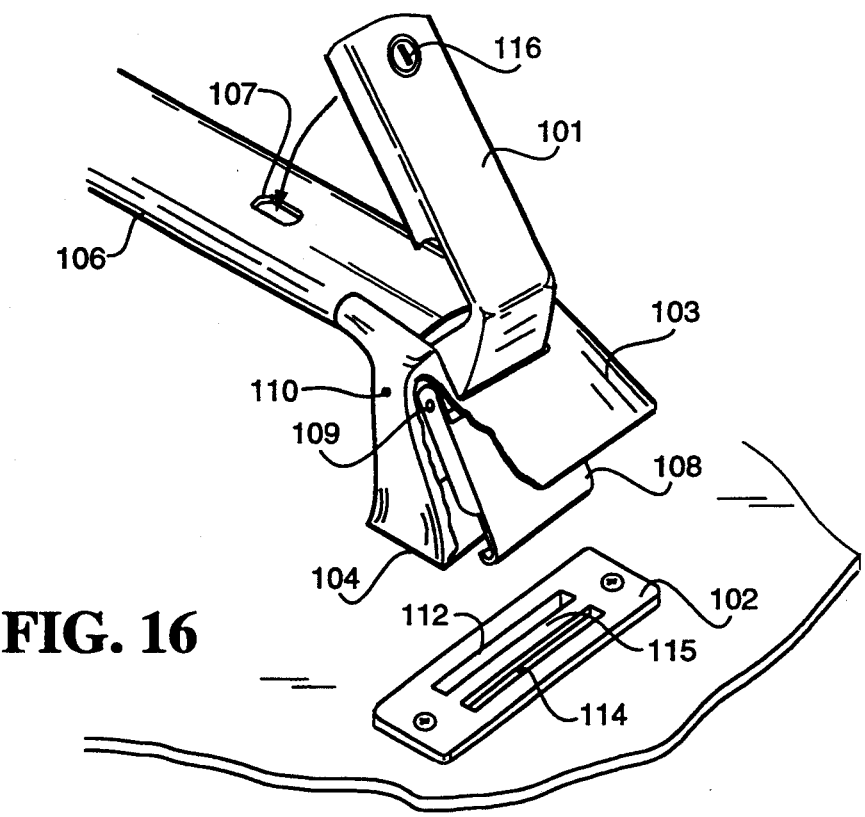

FIG. 16 shows a latching mechanism having actuation means that includes an actuation lever 101 which acts along an axis perpendicular to the longitudinal axis of the illustrated, permanently installed mounting structure 102 installed substantially flush with the exterior surface of the vehicle. An accessory pedestal 103 shown in a partial cutaway view to expose the latching mechanism, consists of a shell with an internal cavity and a base 104 to which a resilient pad (not shown) as in the embodiment of FIG. 2 is affixed. A load supporting bar 106 which acts as a crossbar between the pedestal 103 and a second pedestal (not shown) is attachably affixed to the pedestal by adhesive or mechanical fastening means as appropriate, and has a recessed locking hole 107. A latching member or hook 108 is pivotally attached to the actuation lever 101 by means of a hinge pin 109, the entire assembly being pivotally attached to the pedestal by means of a hinge pin 110 which only penetrates and passes through the lever 101. Prior to attachment of the mounting structure 102, an acceptable sealing means such as a gasket (not shown) is positioned between it and the body panel 111. Such structure has a cavity 112 extending longitudinally in the mounting structure from one end near one fastening means to near the opposite end. A longitudinally extending crossmember 113 is attached at both ends above the cavity. When the actuating lever 101 is in the shown open position, the latching hook 108 extends below the pedestal base 104. When such base is lowered toward the mounting structure, the hook enters the slot 114 caused by the crossmember 113. Upon actuation lever 101 being moved downward and toward the crossbar 106, the latching hook 108 catches the underside of the crossmember 113 of the mounting structure and causes the pedestal to be drawn tightly against it. Keyable locking means which includes key lock 116 engages locking recess 107, thereby securing the lever 101 in the closed position. It is to be noted, though, that the key lock can be unlocked from the locking recess so that the lever 101 is raisable, thereby providing detachable securance as desired.

Figure 17:
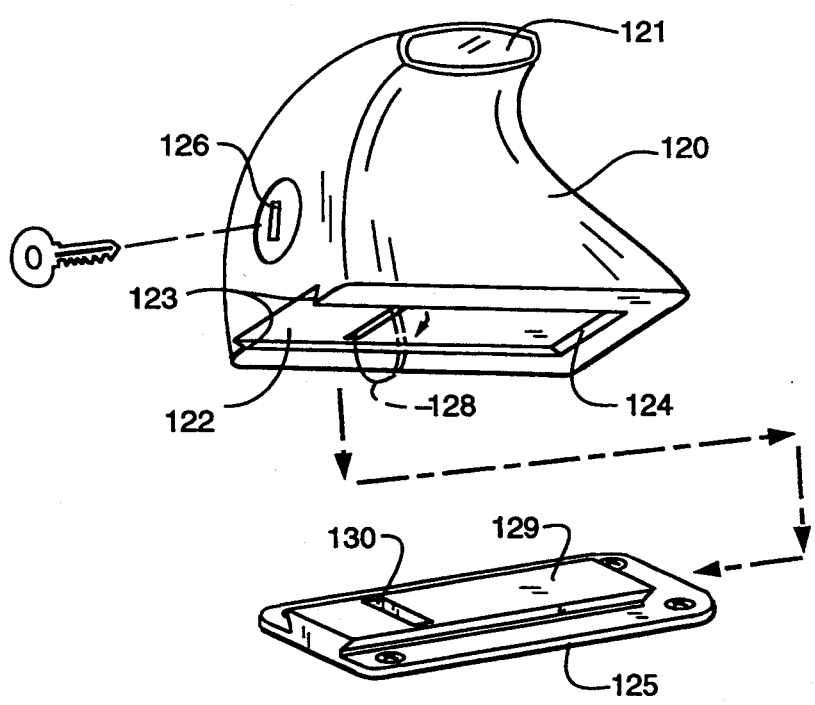

FIG. 17 shows another latch arrangement. A pedestal 120 has a cavity 121 which will accept a load carrying rack crossbar. Its base has a recess 122 with outwardly angled sidewalls 123 which form the female portion of a dovetail slot, having a vertical wall 124 located on the closed end of the recess. A mounting structure 125 is permanently installed on a road vehicle so as to be substantially flush with the exterior surface of the vehicle. A lock 126 is integrally attached to and penetrates the pedestal, which lock is accessible to the exterior as illustrated for locking with a key 127, or with a knob in place of a key. When the lock is actuated, a cam 128 will swing down and in the recess perpendicular to the outwardly angled sidewalls 123. It will lock the pedestal 120 in position only after the pedestal is slidably affixed to the mounting structure and the vertical pedestal surface near the recess 122 open end is aligned and flush fitting with the corresponding vertical surface of the mounting structure. The pedestal is fitted to the mounting structure by first aligning the open end of the recess 122 with the front end of the dovetail 129 of the mounting structure, then by sliding the pedestal rearward and along the length of the mounting structure. The lock cam 128 will engage the cam recess 130 upon locking, thereby preventing the pedestal from being removed from the mounting structure.

Figure 18:
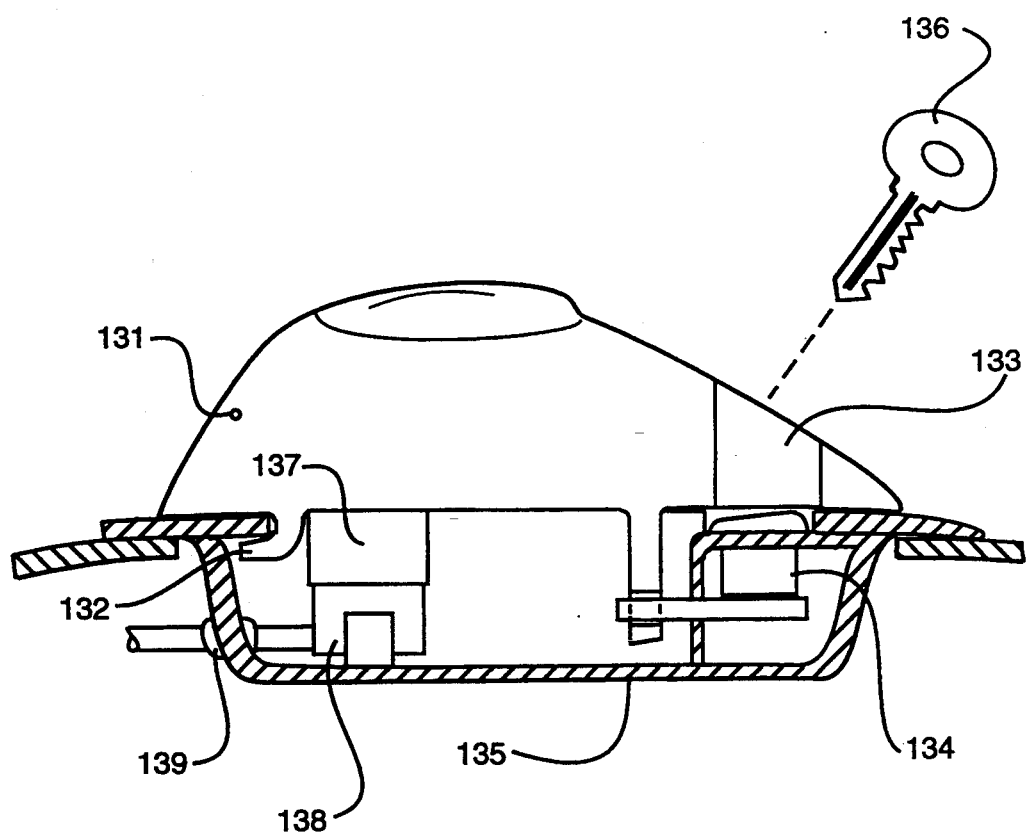
FIG. 18 illustrates an actuator of the latch of the invention incorporated into the permanently installed mounting structure.

In all of the arrangements discussed to this point, the actuator has been part of the accessory latch structure of the invention. It also can be part of the mounting structure which is permanently installed on a road vehicle. FIG. 18 shows one arrangement of such a construction. In this arrangement, the pedestal 131 incorporates a locating and securement means or feature typified by a latching hook 132, shows in a hatched position, which engages the mounting structure mounted substantially flush with the exterior surface of the vehicle. A plurality of fastening means could be incorporated in lieu of this hook. An important aspect of the invention is typified by the access hole 133 within the pedestal which allows access to the latch actuator 134. The actuator itself could take the form of a ramping cam, a screw thread, or a plurality of fastening means which would extend downwardly into the mounting structure represented at 135 providing the means for engagement. A gasket (not shown) can be included to provide elemental sealing for this system. A variety of methods could be employed to effect the actuation, including a tool, a key (illustrated at 136), or hand actuation via exposed wing nuts or the like. The fact that the actuator is contained within the mounting structure is an important feature of this invention. Also shown in FIG. 18 is an electrical interconnection using a male 137 and female 138 interfit coupling. The electrical harness could exit the housing with a weatherproof junction as illustrated at 139.

Figure 19:
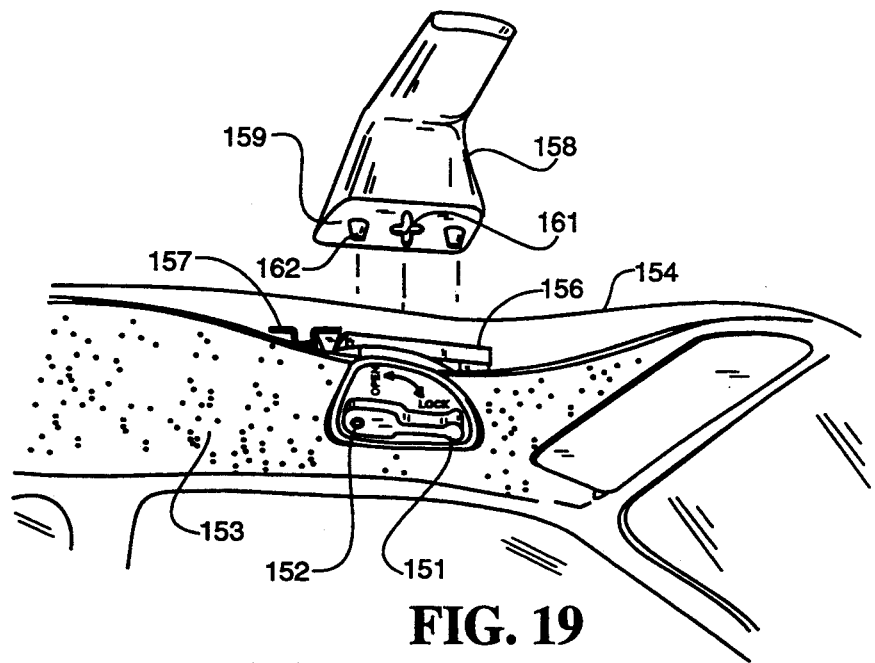
FIGS. 19 and 20 are partial perspective views depicting arrangements for actuating the latch from a location remote from the latch itself, i.e., from within a vehicular compartment.

As another salient aspect of the instant invention, an actuator can be provided for manipulating the connectors between their securing and non-securing positions from a location remote from the location of such connectors. (As used herein, a location is "remote" from the connectors if it is spaced a large distance away from the same and/or is positioned in a location which is inaccessible relative to the connectors themselves, i.e., within a passenger or trunk compartment of an automobile vehicle.) FIG. 19 shows a latching means which is actuated from the interior of an automobile. A latch lever 151 within the vehicle is attachably connected to an actuation shaft 152 that is, in turn, connected to a locking stud for controlling movement of the latter. The locking stud is essentially similar to the locking stud 18 shown in FIG. 2, but it extends in an upward direction and toward the vehicle exterior. Lever 151 and shaft 152 are retained within a decorative escutcheon plate mounted on the underside of a headliner 153 or other vehicle interior finishing material. The entire latching means is structurally affixed to the vehicle on the underside of the exterior body panel 154 by mechanically affixing a mounting structure 156 thereto. Mounting structure 156 is installed on the vehicle so as to be substantially flush with the exterior surface thereof. The void between the headliner 153 and the panel 154 may contain a structural roof member 157 for the mounting structure.

A pedestal 158 to which a crossbar is connected and which extends to a second pedestal (not shown) has a base 159 within which there is a recess 161 having radially extending details similar to those in the FIGS. 2-3 embodiment, allowing interfitting of radially extending locking pins laterally attached to the locking stud. A plurality of bosses 162 are also provided on base 159, extending downward and protruding therefrom. To removably attach the load bearing accessory to the vehicle, the pedestal 158 is lowered toward the mounting structure so that the bosses 162 engage interfitting recesses in such structure. The locking stud with radially extending locking pins rotated to the unlocked and open position is made to engage the pedestal recess 161 so that the locking pins extend beyond and above locking ramps which are similar to the ramps of the embodiment of FIGS. 2-3. Subsequent rotation of the latching lever 151 to the shown closed position causes the locking pins to engage the ramps and draw the pedestal tightly down and upon the mounting structure. In an alternate attachment method, the recess 161 can be replaced by a threaded stud to be threadably received within a threaded knob structurally affixed to the vehicle on the underside of the exterior body panel 154 in a manner which permits rotation thereof. A resilient interposed pad between the pedestal 158 and the mounting structure 156 allows for a weather-tight compressive fit between the parts.

Figure 20:
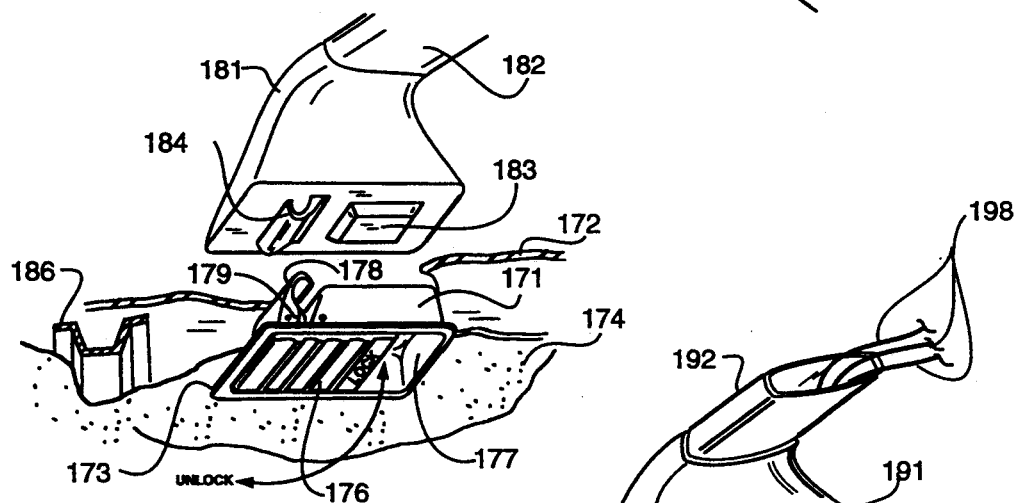

A second latching system accessible to the vehicle interior is shown in FIG. 20. A latching mounting structure 171 is permanently affixed to or on the underside of the exterior body panel 172 by any of a variety of fastening means so as to be substantially flush with the exterior surface of the vehicle. A flange 173 abuts the interior surface of the vehicle interior finishing material headliner 174. The mounting structure further includes a latch lever handle 176 hingedly attached to such structure at the lever fulcrum. A finger well 177 is provided for clearance to access the handle for opening, a latching hook 178 is hingedly attached to the latching lever by means of a hinge pin 179, and a locating recess (not shown) is provided on the upwardly projecting surface of the mounting structure. A load supporting pedestal 181 to which a crossbar 182 is attachably affixed that extends to a second pedestal, has a lateral load resisting boss 183 and latch hook mounting structure 184 extending downward and protruding from the pedestal base. A panel supporting structural member 186 may be located near the mounting structure and in the void between the panel and interior finishing material. To removably affix the pedestal to the vehicle, the pedestal is lowered to the mounting structure with the latch handle 176 of the latter in the downward and open position. The extended latch hook 178 engages the back side of the hook mounting structure 184 while the boss 183 engages the aforementioned recess on the upper surface of the mounting structure. As latch handle 178 is actuated and moved toward the shown closed position, the hook 178 draws the entire pedestal assembly 181 tightly down and together with the vehicle mounted structure 171. In this manner, latch handle 176 is included within the means for controlling the movement of latch hook 178 between its unlatched and latched positions. An resilient pad can be interposed between the pedestal 181 and the mounting structure 171 to provide for a weather-tight compressive fit between the parts.

Figure 21:
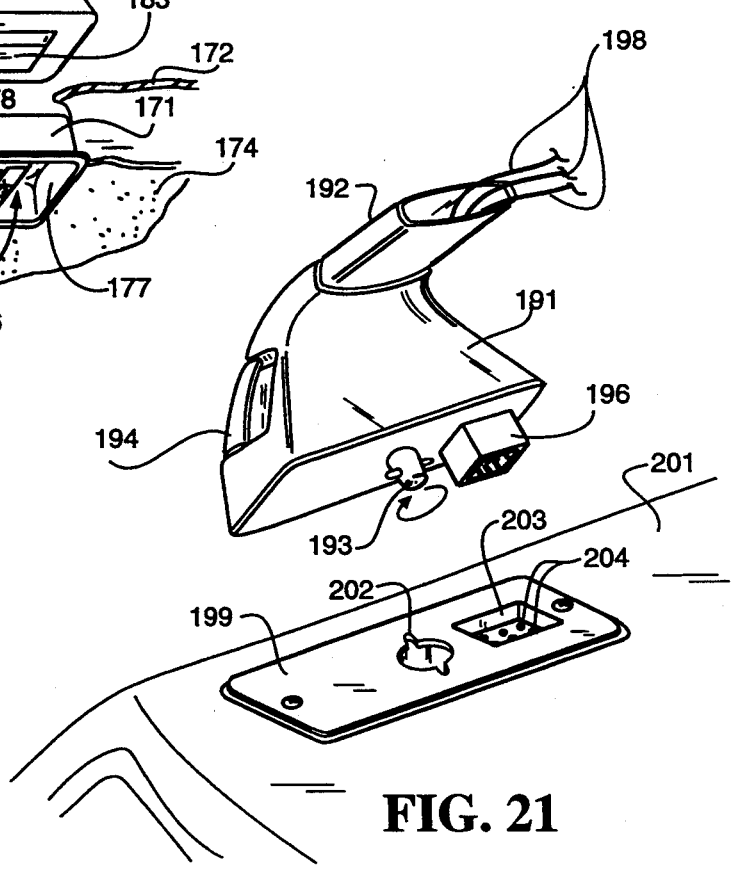
FIG. 21 illustrates a latch of the invention having mating electrical connectors.

Many accessories require for operation that there be an electrical feed-through from the body. The latch structure of the invention is particularly designed to provide such feed-through. While in some instances the feed-through simply can be via the mechanical connection which is provided, in most instances it is necessary that there be one or more electrical connectors. It should be noted that the basic concept of providing a permanently mounted socket on the exterior of a vehicle for electrical connection is not new. Reference is made, for example, to U.S. Pat. No. 3,915,476. Insofar as applicant is aware, though, it is new to provide both mechanical connection and electrical connection to an accessory. FIG. 21 illustrates one arrangement having a separate electrical connector arrangement which is automatically connected when the accessory is removably attached to the automobile. That is, FIG. 21 shows a pedestal assembly 191 with a load supporting crossbar 192 extending from the same to a second pedestal (not shown). It includes a locking stud 193 connected to an operating lever 114 as in the FIG. 2-3 embodiment. Further, extending downwardly from the pedestal base is an integrally molded or affixed electrical plug connector 196 containing a plurality of electrical contacts 197. Each of the contacts 197 is electrically separated from the others and can provide a different level of power, etc., than the others. A plurality of electrical wires 198 attached thereto extend into and along the crossbar for attachment to one or more electrical accessories mounted or mountable thereon. The contacts 197 are electrically insulated from metallic parts or components which may contribute to electrical shorting. A mounting structure 199 is permanently installed substantially flush on the vehicle body with appropriate connectors exposed at the exterior body panel 201. A recess 202 designed to receive a stud 193 which is similar to that in the FIG. 2-3 embodiment, is shown. An electrical socket 203 with a plurality of insulated female electrical contacts 204 all of which are closely interconnectable with corresponding contacts 197 is integrally molded or affixed to the mounting structure. A plurality of wires (not shown) are electrically connected to contacts 204 and extend into and along a path in the vehicle interior to appropriate terminations.

Removably attaching the pedestal 191 to the mounting structure 199 is accomplished by lowering the pedestal so that the mating and interfitting details of the electrical plugs 196 and 203 engage and the stud 193 and recess 202 engage. Actuating latching lever 194 or other means described herein causes the pedestal to be drawn down and upon the mounting structure and causes final interconnection of electrical and mechanical details of the plugs, thereby providing for a detachable electrically continuous path from the vehicle interior to the load supporting pedestal.

Figure 22:
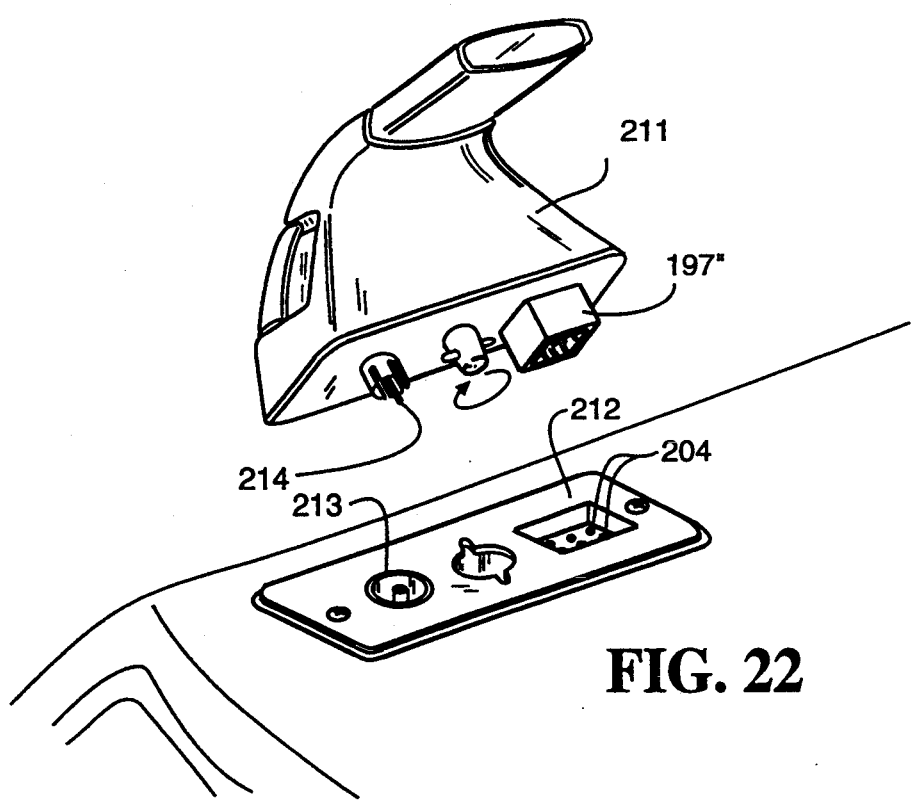
FIG. 22 is similar to FIG. 21 but illustrates a pair of differing electrical connectors.

FIG. 22 shows a pedestal 211 and substantially flush mounting structure 212 having a plurality of electrical contacts 197″ and 204″ retained in interfitting plug halves as in the embodiment of FIG. 21. Further a coaxial connector socket plug 213 is integrally molded or affixed to the mounting structure and an interfitting connectible coaxial connector male plug 214 is integrally molded or affixed to the pedestal. Coaxial cables are primarily used in road vehicles for transmission of communications or radio frequency signals, and appropriate ones connectably extend from the connectors 213 and 214 into and along the vehicle interior and pedestal, respectively, and are terminated as desired at an antenna, or at a communications receiver or transceiver device.

Figure 23:
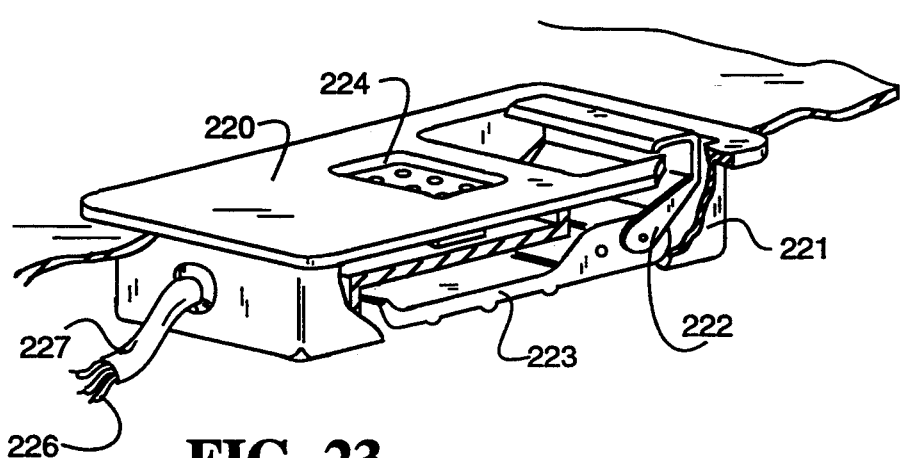
FIG. 23 is a broken away, perspective view of an alternate embodiment of a latch mounting structure incorporating an electrical connector.

Only the mounting structure 220 half of an electrical connector is shown in the embodiment of FIG. 23. It will be understood that a detachable load supporting accessory of a type shown earlier or of another type not shown can be mountably affixed to such structure. Substantially flush mounting structure 220 has latch actuation means accessible from the vehicle interior or panel underside. It includes a structural case 221 which can be a single part or an assembly of parts and into which is mounted and affixed a latch hook 222 pivotally attached to a latching lever actuator 223 shown in the closed and latched position. An electrical plug socket 224 containing a single or a plurality of electrical contacts, such plug being of one of a variety of types selected for a particular purpose and mateable to an interconnecting half located on the mountable pedestal (not shown), is recessed into the interior of the case 221. A wire or plurality of wires 226 electrically connected to the plug 224 extend through and beyond the case exterior and remain positioned by a weather sealing strain relief 227.

Mounting of an attachable accessory to the shown mounting structure is accomplished by first opening the latch actuator 223 to the downward position, thereby causing the latch hook 222 to extend up and above the top surface of the mounting structure, interfitting the hook onto or into a mating means, and closing the latching hook to the illustrated position. The mating electrical plug interfitting with shown socket plug 224 simultaneously occurs, thereby forming a continuous electrical path from the vehicle interior to the accessory through the mounting structure and the accessory pedestal.

Figure 24:
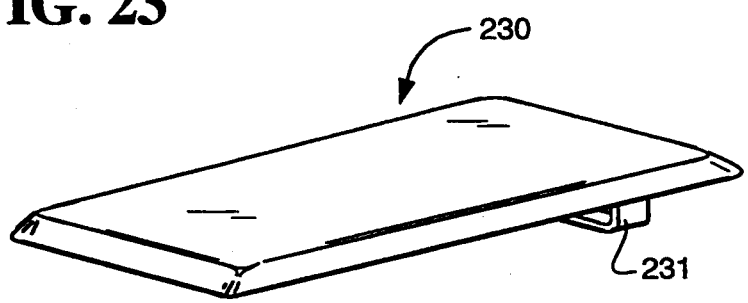
FIG. 24 is a perspective view of a cover plate for the embodiment of FIG. 23.

FIG. 24 shows a cover plate 230 which can be detachably affixed to the mounting structure 220. In this connection, it is provided with the depending mechanical connector 231 on its underside which interfits with latching hook 222. It will be realized that a similar decorative or protective cover plate may be designed to cover any of the permanently installed mounting structures described to this point. It should also be realized that the function of a cover plate is to provide protection and/or decoration when there is no accessory mounted to the mounting structure, and that any number of types and designs of covers manufactured of a number of different materials will suffice.

Figure 25:
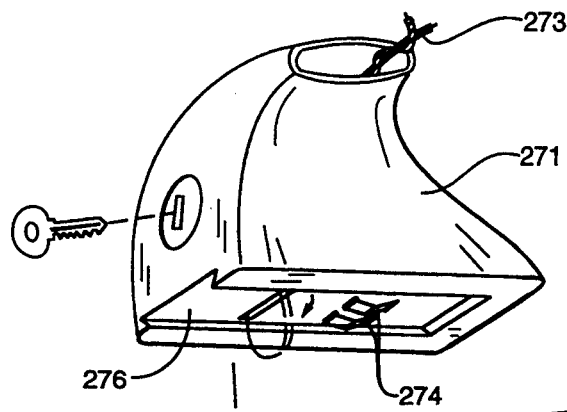
FIG. 25 is a perspective view of a latching structure of the invention showing an alternate electrical connector arrangement.

FIGS. 25-31 illustrate various accessories of differing types requiring both mechanical and electrical input. FIG. 25 shows an alternate arrangement providing both mechanical and electrical connection. It is a pedestal 271 and substantially flush mounting structure 272 of a dovetail slidably interfitting design, as illustrated in FIG. 17. The pedestal primarily is load supporting but additionally allows for the electrical connection of electrical accessories by means of connection to electrical wires 273. A plurality of electrically conductive contacts 274 which may be spring biased are connectably attached to the wires 273. Such contacts are fitted within the recess 276 of the pedestal base so that they are electrically insulated from metallic parts which may cause electrical shorting. The mounting structure 272 has a plurality of electrically conductive contacts 277 which also may be spring biased connectably attached to wires 278 and are electrically insulated from metallic components which may be present in or on the mounting structure. Upon slidably interfitting the pedestal 271 to and upon the mounting structure 272, the electrical contacts located on each part are co-located with the opposing contacts on the other. Engagement of the contacts causes electrical continuity from the wires 278 in the vehicle interior and the wires 273 for electrical accessories. The pedestal is retained to the mounting structure by lock means as shown in FIG. 15.

Figure 26:
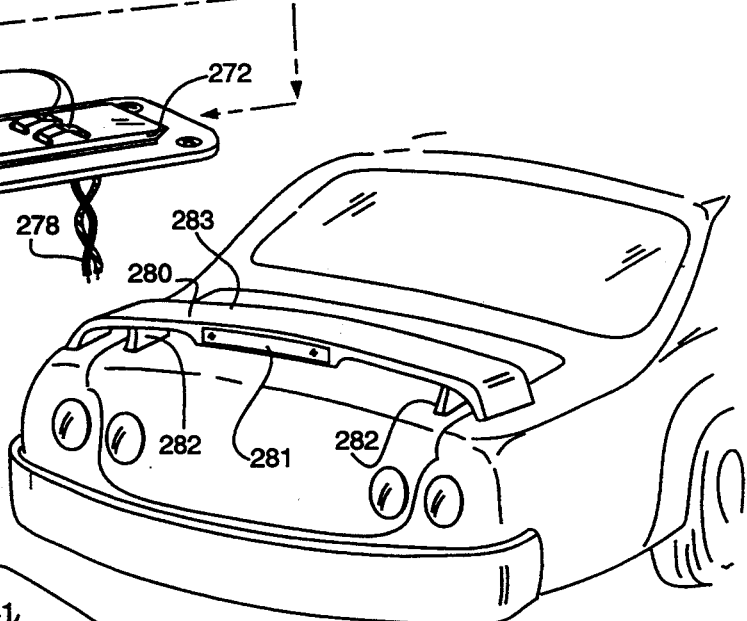
FIGS. 26–31 are partial perspective views illustrating some of the accessories with which the invention is applicable and with which electrical feed-through is necessary.

FIG. 26 shows a rear deck mounted wind stabilizing wing 280 which incorporates a center high mounted stop light 281 centralized and directionally illuminating rearward therefrom. The wing 280 is connectably attached to a pair of supporting pedestals 282, both of which incorporate electrical and mechanical interconnection features of the invention, such as those shown in FIGS. 21 through 23 and in FIG. 25. By means of previously illustrated latching means, the pedestals are removably attached and connected to mounting structures not shown located on and through the rear deck exterior body panel 283. Wires (not shown) extending from the stop light 281 are connectably attached and terminated at an electrical plug half located at the pedestal base. Further, wires connected to the mounting structure half of the interfitting electrical plug connector are extended within the vehicle interior to the appropriate stop light illuminating termination.

Figure 27:
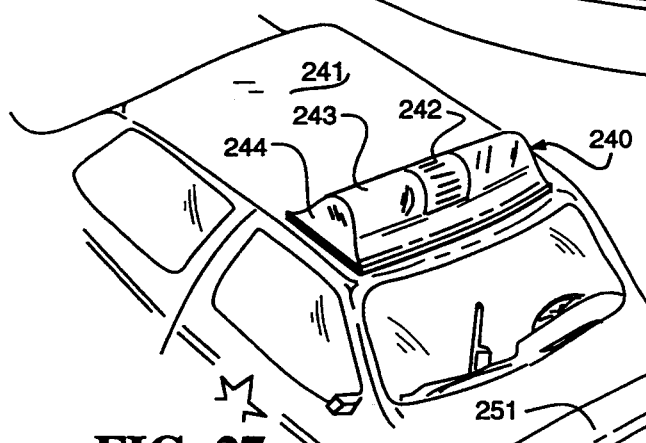

FIG. 27 shows an emergency vehicle lighting and communications system 240 mounted and removably attached to an automobile exterior body panel 241. A plurality of mounting structures and accessory latch structures of the invention (not shown) which incorporate a plurality of coaxial and direct current type of electrical connectors and mechanical latching means are used to connectably attach the interfitting electrical and mechanical details located on the underside of the lighting and communications system 240. The system 240 includes a speaker system 242 used as means to project voice or siren forward of the vehicle, a variety of strobe and colored warning lamps beneath a clear canopy 243, and one or more communications antennas (not shown) similarly contained under the canopy. The base 244 of the system substantially matches the contour of the top surface of the body panel 241, thereby eliminating the traditional air gap between the underside of the lighting system and the vehicle panel, such being responsible for increased wind noise and reduced mileage at highway speeds.

Figure 28:
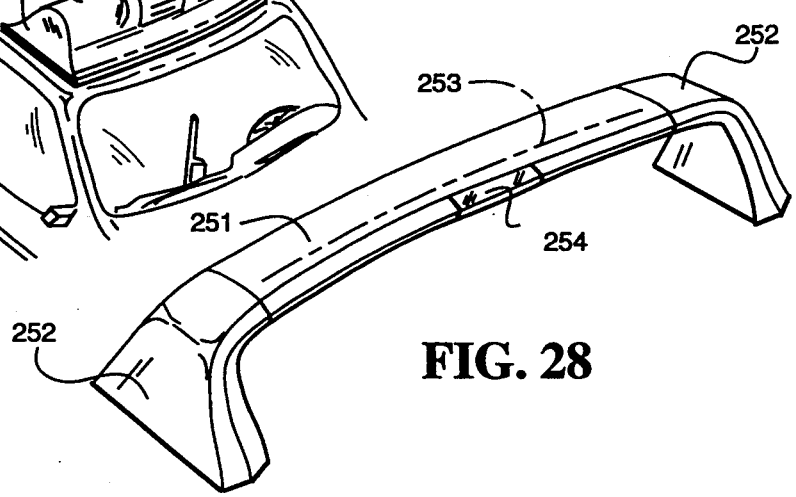

FIG. 28 shows a crossbar 251 connectably attached to a pair of opposed pedestals 252. Dotted line 253 indicates an antenna used for radio frequency communication located within the internal cavity of the crossbar, which antenna has a connectably attached coaxial cable which extends through the crossbar to one of the pedestals where it is connectably terminated by a male or female coaxial plug (not shown) located on the underside thereof. A clear lens 254 is shown on the leading edge of the crossbar. An infrared communications transmitter, receiver or transponder located behind the lens is capable of communicating unimpeded through the lens. Such communication is necessary for communicating with infrared transceivers permanently located on the roadside for intelligent highway vehicle navigation and collision avoidance systems, for example. A coaxial cable and wires not shown but connectably attached to the communications device, extend through the crossbar to a pedestal and are connectably terminated to a male or female plug located on the underside thereof. The plurality of plugs on the underside of the pedestal connectably interfit and mechanically and electrically latch removably, to a pair of co-located mounting structures permanently affixed to the automobile at an exterior body panel.

Figure 29:
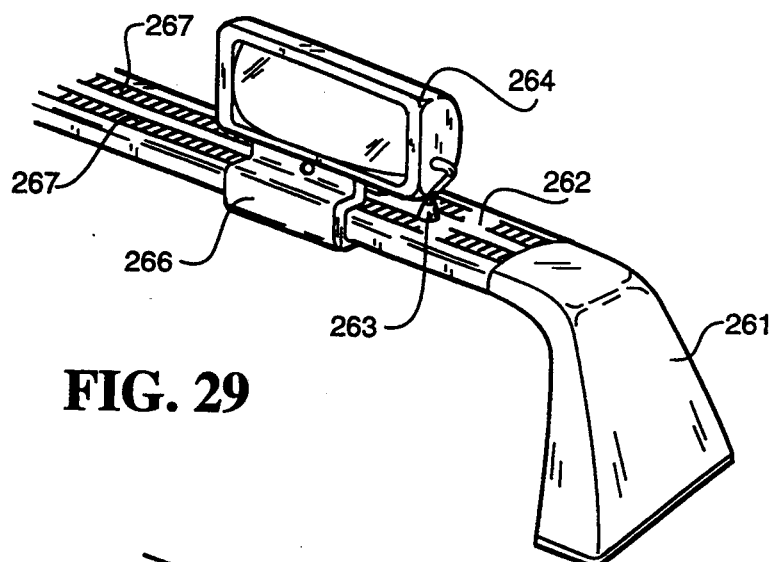

FIG. 29 shows a pedestal 261 which includes an electrical and mechanical attachment means between the pedestal base and mounting structure on the vehicle body panel, with removably interconnectable details as previously described. Attachably affixed thereto and extending laterally therefrom to a second pedestal (not shown) is a crossbar 262. Electrical wires internally located within the hollow portion of the crossbar and pedestal and attachably connected to the electrical plug of a type previously illustrated, are terminated in a second plug 263 attachably connected to and penetrating through the outer wall of the crossbar. A representative electrical accessory shown is a fog or driving lamp 264 mechanically attached to the crossbar by clamping means 66 or other acceptable means, such accessory further being electrically connected to the plug 263.

Instead of electrical wires internally located within the hull portion of the crossbar, a multiple continuity strip system 267 can be utilized to conduct power from the electrical connector in the pedestal 261 to the accessory 264. Such an arrangement requires insulating the strips. However, it allows more freedom of placement of the accessories across the crossbar.

Figure 30:
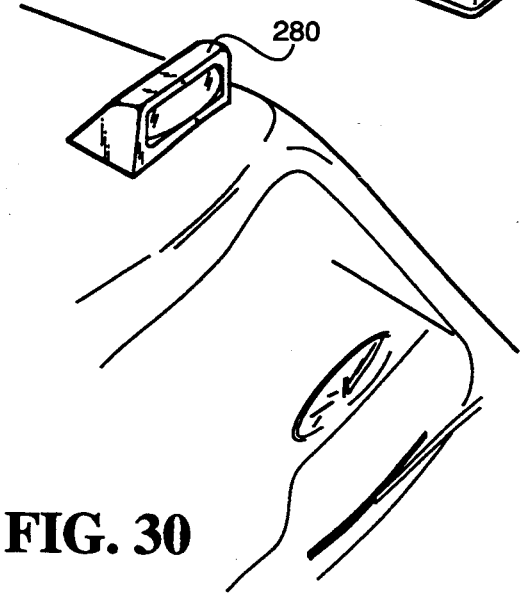

FIG. 30 shows a single lamp 280 which is representative of a singular accessory which is detachably mounted mechanically and electrically to an automobile by mounting structures as previously described, but without the requirement for a pedestal. The base of the accessory integrally contains features and details which are mateably connectable to the mounting structure.

Figure 31:
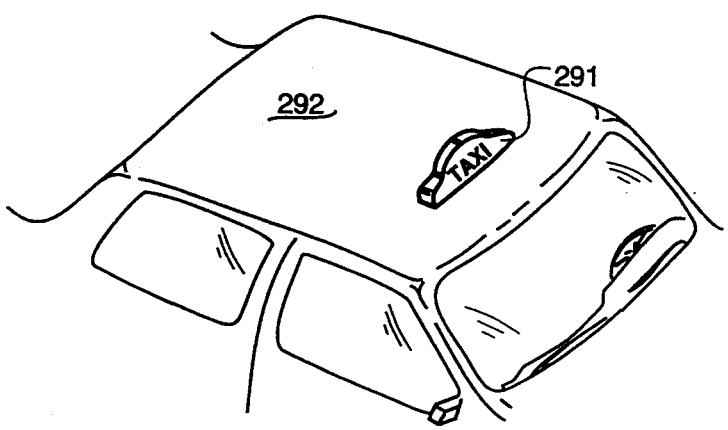

FIG. 31 shows a commercial application of an individually detachably mounted electrical accessory 291 similar to the lamp of FIG. 30 but centered amidship on the vehicle. The accessory may be electrically and mechanically attached by using a single mounting structure, or may be attached using a plurality of structures which mechanically and/or electrically connect the accessory to the automobile exterior body panel 292.

As mentioned at the beginning of the detailed description, Applicant is not limited to the specific embodiments or variations described above. Various changes and modifications can be made. The claims, their equivalents and their equivalent language define the scope of protection.

What is claimed is:

1. In a latch mechanism for use with a vehicle having a body with an exterior surface capable of accommodating an accessory unit, the accessory unit having at least two first mounting assemblies, the combination comprising:
   (a) at least two second mounting assemblies adapted to engage the at least two first mounting assemblies;
   (b) attachment means for attaching the at least two second mounting assemblies to the body of the vehicle substantially flush with the exterior surface of the vehicle body; and
   (c) securement means carried by the at least two second mounting assemblies for cooperatively mating with the at least two first mounting assemblies so as to removably secure the at least two first mounting assemblies to the at least two second mounting assemblies and permit the accessory unit to be easily mounted to the vehicle for use and easily removed therefrom when not in use.

2. The latch mechanism of claim 1 further comprising at least one electrical connector carried by one of said at least two second mounting assemblies and configured to cooperatively mate with a corresponding electrical connector provided one one of said at least two first mounting assemblies by securing said one of the at least two second mounting assemblies to said one of the at least two first mounting assemblies.

3. The latch mechanism of claim 2 wherein said electrical connector on said one of the at least two second mounting assembles is adapted to pass a radio frequency signal received from said one of the at least two first mounting assemblies to a signal conductor.

4. The latch mechanism of claim 2 wherein said electrical connector has at least a pair of types of electrical connections for different electrical characteristics.

5. The latch mechanism of claim 1 wherein said securement means for each of said at least two second mounting assemblies includes a latching member movable between a latched position in which the latching member can engage the first mounting assembly and secure the second mounting assembly thereto and an unlatched position in which the related mounting assemblies can be separated from each other.

6. The latch mechanism of claim 5 wherein said securement means for each of said at least two second mounting assemblies includes an actuator for moving the latching member between said latched and unlatched positions, the actuator being manually manipulatable without the use of tools.

7. The latch mechanism of claim 1 wherein said securement means for each of said at least two second mounting assemblies includes a recess for receiving a latching member carried by the related first mounting assembly.

8. The latch mechanism of claim 1 wherein said at least two second mounting assemblies are each provided with at least one recess for receiving a protuberance extending outwardly from said at least two first mounting assemblies.

9. The latch mechanism of claim 1 wherein at least a portion of each of said at least two second mounting assemblies extends below said exterior surface of the body of the vehicle.

10. In a latch mechanism for use with a vehicle having a body with an exterior surface capable of accommodating an accessory unit, the accessory unit having a first mounting assembly the combination comprising:
   (a) a second mounting assembly adapted to engage the first mounting assembly;
   (b) attachment means for attaching the second mounting assembly to the body of the vehicle substantially flush with the exterior surface of the vehicle body;
   (c) securement means carried by the second mounting assembly for cooperatively mating with the first mounting assembly so as to removably secure the first mounting assembly to the second mounting assembly and permit the accessory unit to be easily mounted to the vehicle for use and easily removed therefrom when not in use; and (d) at least two electrical connectors carried by the second mounting assembly and configured to cooperatively mate with corresponding electrical connectors provided on the first mounting assembly by securing the second mounting assembly to the first mounting assembly, the at least two electrical connectors providing differing electrical characteristics.

11. In a latch mechanism for use with a vehicle having a body with an exterior surface capable of accommodating an accessory unit, the accessor unit having a first mounting assembly, the combination comprising:

(a) a second mounting assembly adapted to engage the first mounting assembly;

(b) attachment means for attaching the second mounting assembly to the body of the vehicle so that the second mounting assembly is substantially flush with the exterior surface of the vehicle body;

(c) securement means carried by the second mounting assembly for cooperatively mating with the first mounting assembly so as to removably secure the first mounting assembly to the second mounting assembly and permit the accessory unit to be easily mounted to the vehicle for use and easily removed therefrom when not in use; and (d) a cover plate securable to the second mounting assembly when the first mounting assembly is not secured to the second mounting assembly.

12. In an accessory unit for use with a vehicle having a body with at least two mounting assemblies secured to the exterior surface of the body and carrying at least one electrical connector, the combination comprising:

(a) an accessory structure;

(b) at least two additional mounting assemblies carried by the accessory structure and configured to engage the first named mounting assemblies;

(c) at least one additional electrical connector carried by the additional mounting assemblies and positioned to engage the first named electrical connector; and (d) securement means carried by the additional mounting assemblies for cooperatively mating with the first named mounting assemblies so as to removably secure the additional mounting assemblies to the first named mounting assemblies and establish an electrical connection between the electrical connectors whereby the additional mounting assemblies permit the accessory unit to be easily mounted to the vehicle and to be easily removed therefrom when not in use.

13. The accessory unit of claim 12 wherein said securement means for each of said additional mounting assemblies includes a latching member movable between a latched position in which the latching member can engage the related first named mounting assembly and secure said additional mounting assembly thereto and an unlatched position in which the related mounting assemblies can be separated from each other.

14. The accessory unit of claim 13 further comprising keyable locking means for locking said latching member in its latched position.

15. The accessory unit of claim 13 wherein said securement means for each of said additional mounting aseemblies includes an actuator for moving the latching member between said latched and unlatched positions, the actuator being manually manipulatable without the use of tools.

16. The accessory unit of claim 12 wherein said securement means for each of said additional mounting assemblies includes a recess for receiving a latching member carried by the related first named mounting assembly.

17. In a latch mechanism for use with a vehicle having a body capable of accommodating an accessory unit and having an interior, the accessory unit having a first mounting assembly, the combination comprising:

(a) a second mounting assembly adapted to engage the first mounting assembly;

(b) means for securing the second mounting assembly to the body of the vehicle;

(c) a latching member carried by the second mounting assembly and movable between a latched position in which the latching member engages the first mounting assembly so as to fasten the first and second mounting assemblies together and an unlatched position in which the mounting assemblies can be separated from each other; and (d) control means within the interior of the vehicle for controlling the movement of the latching member between its latched and unlatched positions.

18. The latch mechanism of claim 17 wherein said body has an exterior surface and wherein said second mounting assembly is secured to the body substantially flush with the exterior surface.

19. In an accessory unit for use with a vehicle having a body with at least two mounting assemblies secured to the exterior surface of the body so as to be substantially flush with the exterior surface, the combination comprising:

(a) an accessory structure;

(b) at least two additional mounting assemblies carried by the accessory structure and adapted to engage the two first named mounting assemblies; and (c) securement means carried by the additional mounting assemblies for cooperatively mating with the first named mounting assemblies so as to removably secure the additional mounting assemblies to the first named mounting assemblies and permit the accessory unit to be easily mounted to the vehicle and easily removed therefrom when not in use.

20. In a method of attaching an accessory unit to the exterior of a vehicle having a body with an exterior surface, the steps of:

(a) selecting a vehicle having at least two first mounting assemblies secured to the body of the vehicle and substantially flush with the exterior surface;

(b) picking an accessory unit having at least two second mounting assemblies which cooperatively mate with the at least two first mounting assemblies;

(c) placing the accessory unit on the vehicle so that the at least two second mounting assemblies engage the at least two first mounting assemblies; and (d) fastening the first and second mounting assemblies together.

21. The method of claim 20 further comprising the step of electrically connecting the first and second mounting assemblies.

22. The method of claim 20 further comprising the step of unfastening another accessory unit having at least two second mounting assemblies which cooperatively mate with said at least two first mounting assemblies from the at least two first mounting assemblies prior to attaching said first named accessory unit to the vehicle, the another accessory unit having differing characteristics from the first named accessory unit.

23. The method of claim 20 wherein said fastening step includes automatically making an electrical connection between related first and second mounting assemblies.

* * * * *